United States Patent [19]
Mong et al.

[11] 3,944,264
[45] Mar. 16, 1976

[54] PIPE BRACKET

[75] Inventors: William K. Mong, North Huntingdon; Fred Temple, Pittsburgh, both of Pa.

[73] Assignee: Westinghouse Air Brake Company, Wilmerding, Pa.

[22] Filed: Jan. 6, 1975

[21] Appl. No.: 538,597

[52] U.S. Cl. ............... 285/137 R; 137/349; 285/63; 285/161
[51] Int. Cl.² ......................................... F16L 39/00
[58] Field of Search............. 285/137 R, 24, 25, 64, 285/158, 161, 63; 137/349, 348, 347, 350; 248/56, 68; 403/177, 202

[56] References Cited
UNITED STATES PATENTS

| | | | |
|---|---|---|---|
| 616,808 | 12/1898 | Ricketts | 285/161 X |
| 1,437,645 | 12/1922 | Genin | 285/25 |
| 1,604,166 | 10/1926 | Jackson | 285/63 |
| 1,660,766 | 2/1928 | Robinson | 285/63 |
| 2,763,923 | 9/1956 | Webb | 285/158 X |
| 2,826,436 | 3/1958 | Hupp et al. | 285/158 |
| 3,254,399 | 6/1966 | Zahuranec | 285/161 X |

*Primary Examiner*—Thomas F. Callaghan
*Attorney, Agent, or Firm*—R. W. McIntire, Jr.

[57] ABSTRACT

A novel, low-cost pipe bracket which is provided with drill holes instead of pre-cast passageways as formed in a casting type bracket, said drill holes being disposed to register with the connection ports of any fluid pressure operable device to be mounted on the bracket. A pipe connector, either of the screw-threaded or butt weld type is placed in each drill hole and secured therein by a flange formed on the connector being drawn up against a shoulder formed in the drill hole when the valve device is secured to the pipe bracket. Thus, when the pipes have been connected to the pipe connectors, the valve device may be removed without disconnecting the pipes from the bracket.

3 Claims, 5 Drawing Figures

PIPE BRACKET

BACKGROUND OF THE INVENTION

As is well known, one purpose of having a pipe bracket having connected to one side thereof the pipes via which pressurized fluid may flow to and from a fluid pressure operable valve device, for example, and having mounted on the opposite side thereof the valve device itself, is to permit removal of the valve device for replacement or maintenance without having to disconnect the pipes associated therewith. Pipe brackets of this type are commonly cast with the required passageways, by which the pipes are communicated to the various ports in the valve device, being formed therein by the use of cores in the mold from which the bracket is cast. Forming of passageways in a casting by use of cores is a costly process and not always necessarily successful.

SUMMARY OF THE INVENTION

The object of the present invention, therefore, is to provide a low-cost pipe bracket in which the passages for communicating the pipes connected to one face of the bracket with the respective ports of the valve device mounted on the opposite face of the bracket, are formed by means less costly than the process of casting the passages by the use of cores in the molds.

Briefly, the invention comprises a pipe bracket including a plate portion having holes drilled transversely therethrough and disposed so as to register with the ports formed on a fluid pressure operable valve device, for example, to be mounted on a valve face of the plate portion. A pipe fitting or connector, either of the screw-threaded or butt weld type, is inserted into each drill hole from the valve face side of the plate portion and protrudes therethrough beyond the opposite or pipe-connecting face of the plate portion, so that a flange formed on the pipe connector abuts against a complementary shoulder formed in the drill hole. The pipe connectors are thus locked into position when the valve device is secured against the valve face of the plate portion, whereupon the several pipes are connected to the protruding ends of the pipe connectors either by a screw-threaded sealing arrangement or by welding the abutting ends of the pipes and the pipe connectors to each other. Thus, after the pipes have been secured to the respective pipe connectors, the valve device may be removed from the pipe bracket for replacement or maintenance without disconnecting the pipes. Since the holes or passages in which the pipe connectors are inserted are drilled rather than cast therein, the brackets, depending upon the number to be manufactured and as the cost warrants, may be manufactured either by casting or fabricating from steel plate.

DESCRIPTION AND OPERATION

Figure 1:
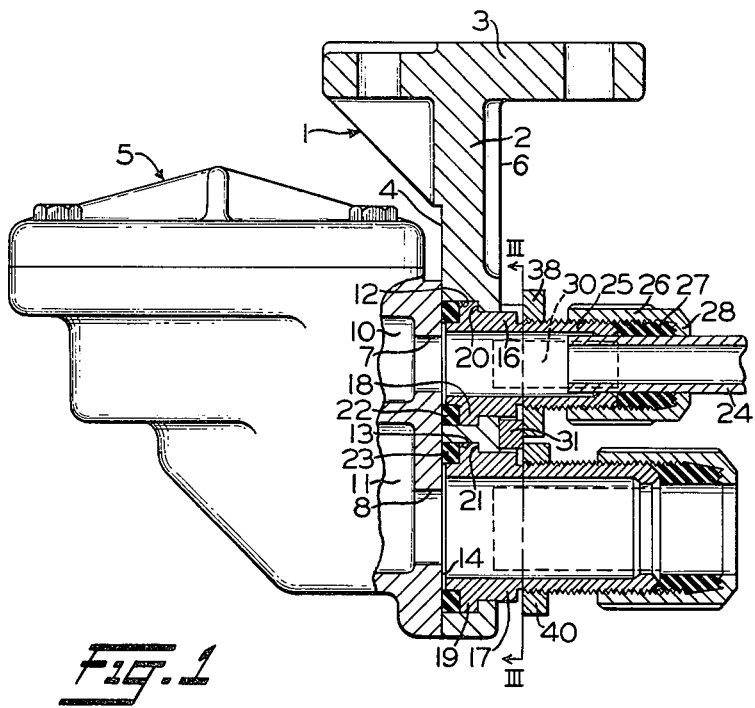
FIG. 1 is an elevational view, partly in section and partly in outline, of a pipe bracket embodying the invention and having a valve device mounted thereon.
Figure 5:
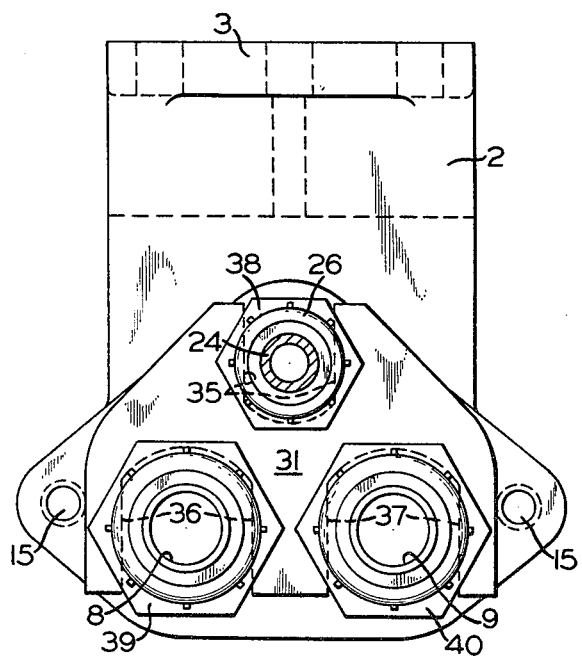
FIG. 5 is an end view, in outline, of the pipe bracket as viewed from the right-hand side of FIG. 1.

A pipe bracket 1, as shown in FIG. 1, comprises a pipe-connecting base plate portion 2 which may have, either integrally (as shown in FIGS. 1 and 5) or removably attached and at right-angle thereto, a mounting portion 3 by which the pipe bracket may be secured to the underframe (not shown) of a railway car, for example.

Pipe-connecting portion 2 of pipe bracket 1 is provided on one side with a valve face 4, against which a valve device 5 is sealingly removably secured, and on the opposite side with a pipe-connecting face 6 to which the pipes necessary for flow of pressurized fluid to and from said valve device are connected in a manner to be hereinafter disclosed.

Valve device 5 may be any type fluid pressure operable valve device with which it may be desirable to use pipe bracket 1 which permits removal of the valve device for replacement or repair without disconnecting the pipes connected thereto. Valve device 5, as shown in this case, is a conventional empty-load type device, but it should be understood that the type of valve device or the details thereof are not essential to an understanding of the invention and, therefore is shown merely for purpose of illustrating the applicability of pipe bracket 1 with a valve device.

Valve device 5 is provided, in this case, with three fluid pressure ports 7, 8, and 9 (only two of which, 7 and 8, may be seen in FIG. 1) opening to respective chambers formed in said valve device, only two of which, 10 and 11, may be seen in FIG. 1. Pipe-connecting portion 2 of pipe bracket 1 is also provided with a plurality of stepped bores extending transversely therethrough and disposed so as to register with ports 7, 8, and 9, two of said bores 12 and 13 being shown in FIGS. 1 and 2.

Figure 2:
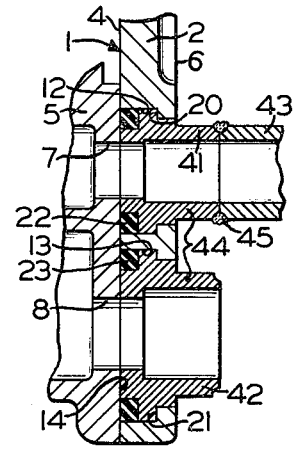
FIG. 2 is a fragmentary elevational view, in section, of a modified form of the pipe bracket shown in FIG. 1.
Figure 3:
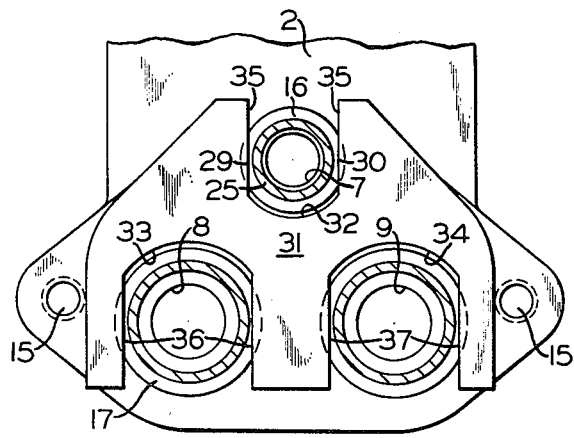
FIG. 3 is a sectional view taken along line III—III of FIG. 1 as viewed from the direction indicated by the arrows.

Valve device 5 is provided with a sealing face 14 which abuts against valve face 4 of pipe bracket 1 when said valve device and pipe bracket are sealingly secured to each other by means of bolts 15, as best seen in FIG. 3. Prior to securement of valve device 5 and pipe bracket 1 to each other, screw-threaded, grip-type pipe connectors or fittings 16 and 17, as seen in FIG. 1, are inserted into stepped bores 12 and 13, said pipe connectors having flanges 18 and 19 for abutting against shoulders 20 and 21 formed in said stepped bores for positioning said pipe connectors, respectively. Sealing elements, such as 22 and 23 as seen in FIGS. 1 and 2, are disposed behind flanges 18 and 19, respectively, and sealingly compressed when valve device 5 and pipe bracket 1 are secured to each other, thereby preventing leakage of fluid pressure therebetween.

A pipe connection made with the conventional screw-threaded grip type connector is illustrated in FIG. 1 with connector 16. The end of a pipe 24 to be connected to pipe bracket 1 is inserted into a threaded stud portion 25 of connector 16 protruding from face 6 of pipe bracket 1. A nut 26 having an annular sealing gland 27 disposed therein in surrounding relation to pipe 24 is screwed onto stud portion 25 thereby compressing sealing gland 27 between the end of said stud portion and a radially inwardly disposed collar 28 formed on the outer end of nut 26, thus sealingly gripping pipe 24 for preventing leakage at the connection and displacement of said pipe from the connector.

Figure 4:
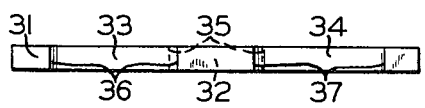
FIG. 4 is an end view of one of the components of the pipe bracket as viewed from the bottom of FIG. 3.

In order to prevent rotation of the stud portions, such as stud portion 25 of connector 16 in bore 12, for example, when nut 26 is tightened thereon, said stud portion, as well as the other stud portions, is provided with parallel flat surfaces 29 and 30 on diametrally opposite sides thereof. A locking plate 31, as shown in FIGS. 3 and 4, when in an installed position is secured against pipe-connecting face 6 and is provided with correspondingly located and a corresponding number of openings 32, 33, and 34 as there are pipe connectors, such as 16 and 17, which extend through said openings. Openings 32, 33, and 34 are characterized by respective pairs of parallel sides 35, 36, and 37, so spaced apart as to snugly engage the respective flat surfaces, such as sides 35 against 29 and 30, of the pipe connectors.

Locking plate 31, once in position, is secured therein by nuts 38, 39, 40 screwed onto the stud portions, such as stud portion 25, up against said plate, as may best be seen in FIGS. 1 and 4. With locking plate 31 secured in position, pipe 24 is inserted in stud portion 25 of pipe connector 16 and nut 26 is tightened thereon until sealing gland 27, in well known manner, has effectively sealed the connection to port 7 and locked said pipe against displacement.

After connections to the other ports 8 and 9 have been made in a manner similar to the connection made to port 7, as above described, and with all sealing elements, such as 22 and 23, in position (the third one at port 8 not being shown), valve device 5 is secured against sealing face 4 of pipe bracket 1 by bolts 15, said sealing elements being compressed against the adjacent face of said valve device as said bolts are drawn up, thereby effecting an air tight seal between the valve device and the pipe bracket.

It should be evident that should it be necessary to remove valve device 5 from pipe bracket 1, either for replacement or maintenance, it is only necessary to remove bolts 15 while the several pipe connections remain undisturbed.

An alternative arrangement of pipe bracket 1 with valve device 5, as shown in FIG. 2, differs from that shown in FIGS. 1, 3, 4, and 5, in that a different type of pipe connector is employed, only two of which, 41 and 42, are shown. Since the ends of the pipes, one of which 43 is shown, are abutted against the protruding ends 44 of the connectors and sealingly welded in such abutting relation, as shown at 45 in FIG. 2, there is no need for screw threads on said connectors nor means for preventing rotation thereof in their respective bores, such as in bores 12 and 13. After the welded connections have been made, valve device 5 and pipe bracket 1 are assembled in similar fashion to that described above in connection with FIG. 1.

Having now described the invention, what we claim as new and desire to secure by Letters Patent is:

1. A pipe bracket for accommodating pipe connections to a fluid pressure operable device having a plurality of ports via which fluid pressure may flow to and from the device, said pipe bracket comprising:
   a. a base plate portion on one side of which the fluid pressure operable device may be secured and having formed therein a similar number of transverse bores correspondingly located as the ports in the device so as to register therewith, respectively;
   b. respective pipe connectors inserted a limited coaxial distance into said bores from said one side of said plate portion, each of said connectors having a stud portion protruding beyond the other side of said plate portion and to which a pipe may be connected;
   c. a locking plate having a plurality of openings corresponding in number and position to said stud portions so as to fit thereon in a locking position in which said pipe connectors are locked against rotation in said transverse bores, respectively,
   d. said openings each having internal flat surfaces which, in the locking position of said locking plate, engage complementary flat surfaces formed externally on each of said stud portions; and
   e. means securable on said stud portions for retaining said locking plate in its said locking position.

2. A pipe bracket, as set forth in claim 1, wherein said stud portions of said pipe connectors are externally threaded and said means securable thereon comprise respective screw-threaded nuts.

3. A pipe bracket, as set forth in claim 1, wherein said locking plate is secured in its said locking position against said other side of said base plate portion.

* * * * *